United States Patent [19]

Kawada

[11] 4,011,592

[45] Mar. 8, 1977

[54] CASSETTE TAPE RECORDER WITH TAPE PAD

[75] Inventor: Takehiko Kawada, Yokohama, Japan

[73] Assignee: Denki Onkyo Company, Ltd., Tokyo, Japan

[22] Filed: Apr. 29, 1975

[21] Appl. No.: 572,896

[30] Foreign Application Priority Data

| Apr. 30, 1974 | Japan | 49-49184 |
| May 10, 1974 | Japan | 49-52493 |
| May 25, 1974 | Japan | 49-58977 |
| May 24, 1974 | Japan | 49-59533[U] |
| May 24, 1974 | Japan | 49-59535[U] |
| May 24, 1974 | Japan | 49-59536[U] |
| May 25, 1974 | Japan | 49-60152[U] |
| June 20, 1974 | Japan | 49-72831[U] |
| June 21, 1974 | Japan | 49-72950[U] |
| June 21, 1974 | Japan | 49-72951[U] |

[52] U.S. Cl. ............................ 360/130; 242/76; 242/199; 360/96; 360/132
[51] Int. Cl.² .................. G11B 23/04; G11B 15/29; G11B 15/60
[58] Field of Search .............. 360/130, 132, 96, 93; 242/76, 189, 193–194, 199–200

[56] References Cited

UNITED STATES PATENTS

| 3,218,440 | 11/1965 | Albosta | 360/130 |
| 3,596,006 | 7/1971 | Lawhon | 360/132 |
| 3,674,942 | 7/1972 | Sugaya et al. | 360/130 |
| 3,682,486 | 8/1972 | Zwetzig et al. | 360/130 |
| 3,834,651 | 9/1974 | Hashizume et al. | 360/96 |
| 3,881,187 | 4/1975 | Nakamichi | 360/96 |

*Primary Examiner*—Alfred H. Eddleman
*Attorney, Agent, or Firm*—Armstrong, Nikaido & Wegner

[57] ABSTRACT

A cassette tape recorder includes a tape pad which is mounted in an upright position in the recorder for insertion into a wall opening in a tape cassette so as to cause a satisfactory pressure engagement of a magnetic tape therein with a magnetic head which is to be inserted into a window other than a central window of the tape cassette during a record or playback operation, thus improving a record and/or playback response.

15 Claims, 12 Drawing Figures

CASSETTE TAPE RECORDER WITH TAPE PAD

The invention relates to a cassette tape recorder, and more particularly to a cassette tape recorder having a plurality of magnetic heads in which the pressure engagement of a magnetic tape against a magnetic head is assured by the provision of a tape pad.

A tape cassette usually comprises a compact structure including a magnetic tape contained within a tape housing. The magnetic tape is exposed through a central window in which a tape pad is mounted as well as through two pairs of windows which are disposed symmetrically with respect to the central window. A cassette tape recorder for use with such a tape cassette is usually provided with a single magnetic head which serves as both record and playback head, the magnetic head being inserted into the central window in the tape cassette for contact with the magnetic tape therein. A satisfactory pressure engagement of the magnetic tape against the head is assured by a tape head which is provided within a central window of the tape cassette. However, for an erase head which is inserted into a window of the cassette other than the central window, the pressure engagement of the magnetic tape therewith is insufficient, thereby giving rise to a possibility of an incomplete erasure depending on the kind of the magnetic tape used. On the other hand, a cassette tape recorder is recently demanded which is provided with a record and a playback head separately as in a tape recorder of open reel system so as to permit a monitoring during a record operation. At this end, such a tape recorder must be provided with at least three magnetic heads including the erase head, which are to be inserted into the respective windows in the tape cassette. For the magnetic head which is to be inserted into the central window in the tape cassette, that is, the playback head, a positive pressure engagement of the magnetic tape therewith is assured by the tape pad which is provided within the tape cassette itself, while a satisfactory pressure engagement of the magnetic tape cannot be achieved with respect to other magnetic heads such as record and erase heads which are to be inserted into other windows in the cassette in which no tape pad is present. As a result, the frequency response of signals recorded on the magnetic tape by the record head way be considerably degraded, accompanied with an unsatisfactory S-N ratio.

It is an object of the invention to provide a cassette tape recorder which assures a positive pressure engagement of a magnetic tape against a magnetic head which is to be inserted into a window of a cassette in which no tape pad is present.

It is another object of the invention to provide a cassette tape recorder which minimizes wow or skew as well as damage of a magnetic tape and which produces a stabilized playback of the magnetic tape.

It is a further object of the invention to provide a cassette tape recorder having a plurality of magnetic heads which achieves an improved frequency response and S-N ratio during a record and a playback operation.

It is an additional object of the invention to provide a cassette tape recorder having a tape pad which maintains a satisfactory pressure engagement of a magnetic tape against a magnetic head that is to be inserted into a smaller window adjacent to the central window of a tape cassette so as to achieve a stabilized record and/or playback response and which is adapted to be inserted into a position control aperture in the tape cassette when the latter is mounted in the recorder.

The cassette tape recorder constructed in accordance with the invention includes a capstan shaft and a pair of position control members which are substantially aligned with the capstan shaft. The recorder includes a tape pad which is uprightly mounted therein at a position of either position control member and/or a position which is on the opposite sides of the position control members from the capstan shaft. When a tape cassette is mounted in the tape recorder, the tape pad is inserted into the tape cassette through a position control aperture which is formed in the tape cassette at a position corresponding to a window other than the central window and/or through a capstan opening for maintaining a magnetic tape in abutting relationship with a magnetic head which is to be inserted into a window other than the central window of the tape cassette, thereby achieving an improved record and playback response.

Figure 1:
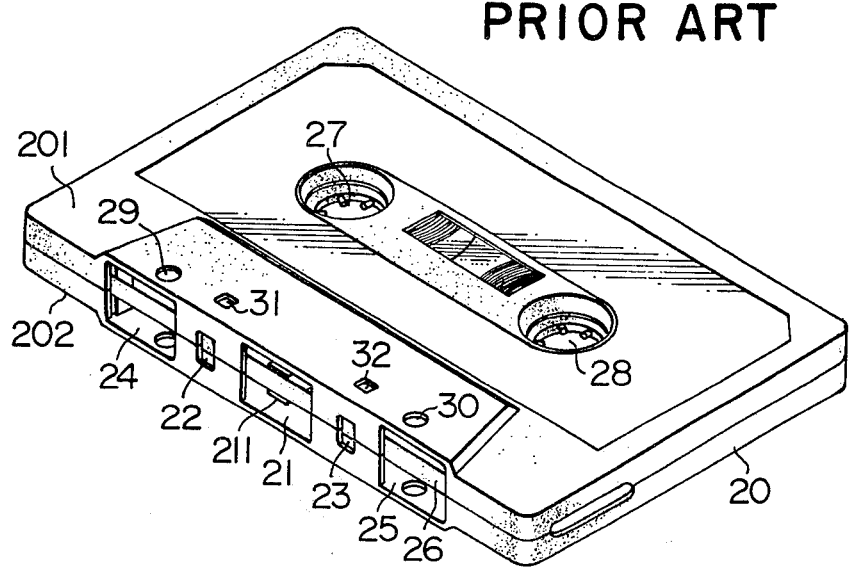
FIG. 1 is a perspective view of a conventional tape cassette.

FIG. 1 shows a conventional tape cassette which may be used in the tape recorder of the invention. A standard tape cassette 20 is formed in its front end face with a central window 21, a pair of smaller windows 22, 23 and another pair of larger windows 24, 25 all of which are adapted to expose part of a magnetic tape 26. The cassette 20 includes a top wall 201 and a bottom wall 202 having apertures 27, 28 formed therein for receiving reel shafts. The magnetic tape is taken up on a pair of spools having bosses which are coaxial with the apertures 27, 28. Also formed in the top wall 201 and the bottom wall 202 of the tape cassette 20 are a pair of capstan holes 29, 30 which communicate with the larger windows 24, 25, respectively, as well as a pair of position control apertures 31, 32 which communicate with the smaller windows 22, 23, respectively. An internal tape pad 211 is resiliently mounted in the central window 21 for urging the magnetic tape 26 forwardly or outwardly from the central window 21 when the cassette is mounted in the recorder.

Figure 2:
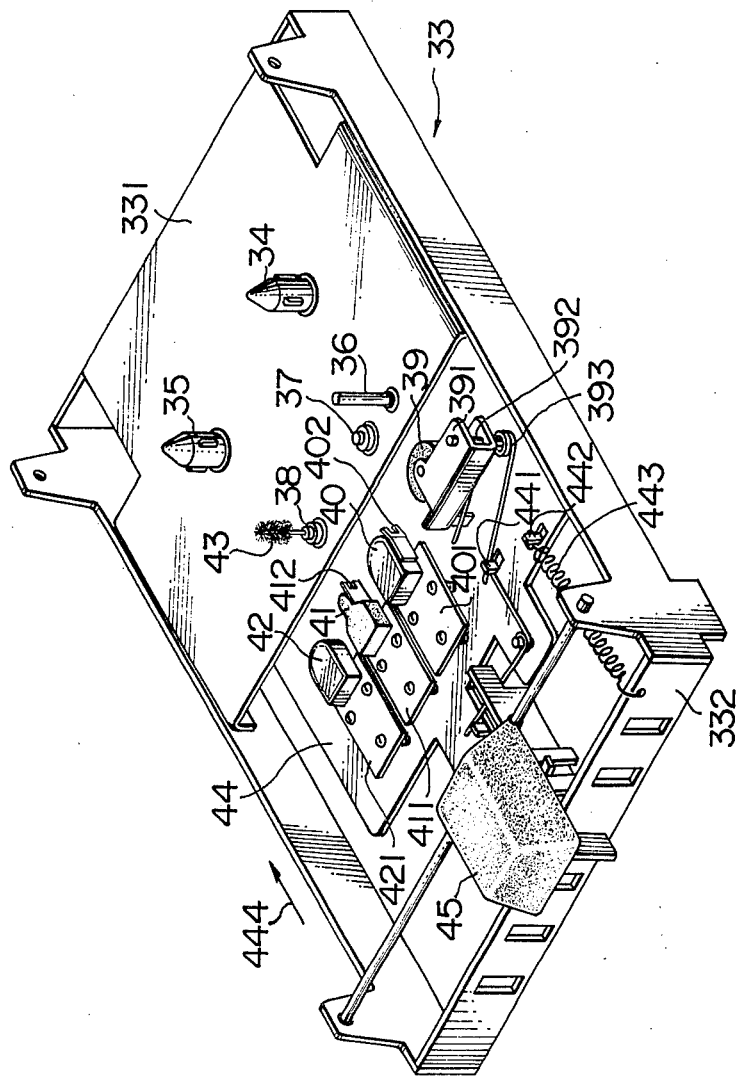
FIG. 2 is a fragmentary perspective view of the cassette tape recorder according to the invention.
Figure 4:
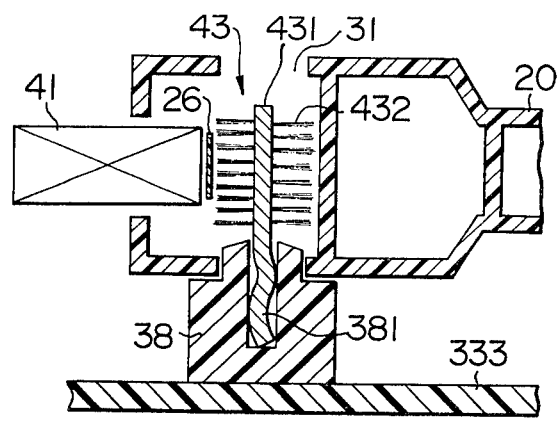
FIG. 4 is a cross section taken along the line 4—4 shown in FIG. 3.

FIG. 2 shows part of the cassette tape recorder having three magnetic heads which is constructed with in accordance with the invention. The tape recorder is generally shown by reference numeral 33 and includes a top panel 331 through which extend a pair of reel shafts 34, 35 which are adapted to be engaged with the reel apertures 27, 28 formed in the tape cassette 20 for driving the magnetic tape. A capstan shaft 36 extends through the panel 331, from which a pair of position control members 37, 38 for the tape cassette project. The capstan shaft 36 is adapted to be engaged with one of the capstan holes, 30, formed in the tape cassette for cooperating with a pinch roller 39 which is to be inserted into the larger window 25, thereby causing the magnetic tape 26 to run at a uniform speed. The pair of position control members 37, 38 are adapted to be fitted with position control apertures 31, 32, respectively, for positioning the front end face of the tape cassette 20, or more precisely, that portion of the magnetic tape 26 which is exposed through the windows 21 to 25 in opposing relationship with magnetic heads 40, 41 and 42. The pinch roller 39 as well as the magnetic heads 40, 41 and 42 are mounted on a movable plate 44. Specifically, the pinch roller 39 is rotatably mounted on a channel-shaped support 391 which is pivotally mounted on the movable plate 44. The support 391 is resiliently biased by a spring 393 in a direction to urge the pinch roller 39 toward the capstan shaft 36, the spring 393 being engaged with a pawl 441 cut from the movable plate 44 at its one end and engaged with the support 391 at its other end. The magnetic heads 40, 41 and 42 are secured to their respective mounts 401, 411 and 421, which are in turn attached to the movable plate 44 by means of screws, on each of which a coiled spring is disposed. The magnetic heads 40 and 41 carries tape guides 402 and 403, respectively. When a pushbutton 45 is depressed, the movable plate 44 is moved in the direction indicated by an arrow 444 to insert the pinch roller 39 into the larger window 25 in the tape cassette so as to engage the magnetic tape 26 with the capstan shaft 36 under pressure. In addition, the movement of the plate 44 is effective to insert the magnetic heads 40, 41 and 42 into the windows 21, 22 and 24 of the tape cassette for bearing engagement with the magnetic tape 26. The movable plate 44 is reset by depression of a pushbutton, not shown, to unlock the pushbutton 45, whereupon a spring 443 which is secured to a chassis 332 at its one end and engaged with a pawl 442 on the movable plate at its other end is effective to return the movable plate to its initial position.

Figure 3:
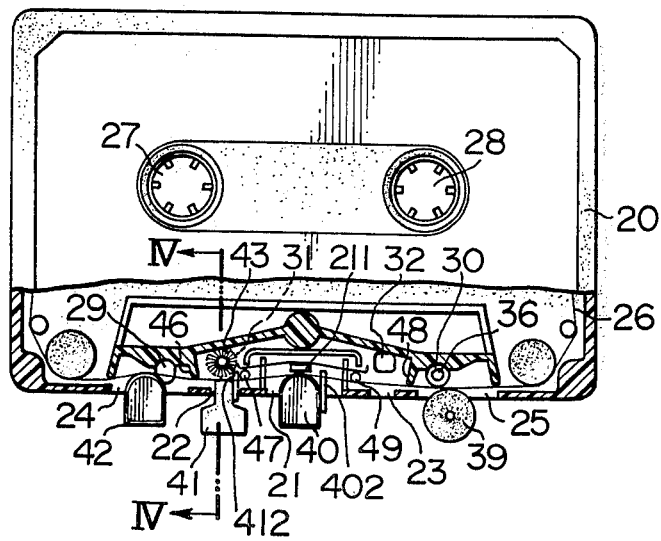
FIG. 3 is a plan view of a portion of the cassette tape recorder with a tape cassette mounted therein, the tape cassette being partly shown in section.

In accordance with the invention, the position control member 38 is provided with a brush-shaped tape pad 43 which is adapted to be inserted into the position control aperture 31 in the tape cassette 20 to urge the magnetic tape 26, as the cassette is loaded, against the magnetic head 41 which is to be inserted into the smaller window 22. As will be apparent from FIG. 3, during use, the capstan shaft 36 and the tape pad 43 are fitted into the capstan hole 30 and the position control aperture 31 in the tape cassette 20, the pinch roller 39 is inserted into the larger window 25, and the magnetic heads 40, 41 and 42 are inserted into the windows 21, 22 and 24, respectively. The magnetic tape 26 is caused to run at a uniform speed as a result of its engagement between the capstan shaft 36 and the pinch roller 39, and is urged against the playback head 40 by means of the tape pad 211 which is provided within the tape cassette 20. Furthermore, in accordance with the invention, the magnetic tape 26 is also urged against the record head 41 under the action of the tape pad 43. It is preferred that the record head 41 be mounted at a location such that its tip is slightly retracted as compared with the tip of the playback head 40. This is because of the provision of closely spaced tape guides 46, 47, 48 and 49 in the region of the position control apertures 31, 32 of the tape cassette, so that if the tip of the record head 41 is allowed to be advanced deep into the tape cassette 20, there will be produced a sharp bend in the magnetic tape 26 in the region between the tape guides 46 and 47. This results in an unfavorable angle of contact or encounter of the magnetic tape 26 with respect to the head 41, to thereby degrade the frequency response and to increase the wow or skew, with consequence that the magnetic tape becomes unstable in running and becomes liable to damage. While these disadvantages have been recognized previously, no remedy has been proposed in the prior art because a retracted position for the recorder head 41 will result in an insufficient pressure engagement between the magnetic tape 26 and the record head 41. However, in accordance with the invention, a sufficient pressure engagement of the magnetic tape 26 against the record head 41 is assured by the provision of the tape pad 43 with only a slight curvature in the tape produced by the tape guides 46, 47. Since the position control aperture 31 in the tape cassette is then somewhat displaced from the line joining the tape guides 46 and 47, it is desirable that the tape pad 43 has an apparent diameter which is greater than that of the position control aperture 31. The construction of the tape pad 43 will be described more fully later, but it suffices to mention here that the tape pad is readily accessible through the aperture 31 and is capable of expanding to a greater diameter than that of the aperture 31. In one example shown in FIGS. 6 and 7, for example, it may comprise a shank 431 on which fibres 432 are planted in the form of a brush. It will be appreciated that the front portion of the tape cassette 20 is maintained at a suitable elevation or height relative to the magnetic head 41 by means of the position control member 38, which is secured to a chassis plate 333 of the recorder 33 and which is formed with an opening 381 in its top. The shank 431 of the tape pad 43 is bent at its one end, which end is inserted into the opening 381 to be secured therein. Such an arrangement facilitates a replacement of the tape pad 43 when its brush 432 is worn out. The brush 432 of the tape pad 43 is entirely received within the tape cassette 20, to urge the magnetic tape 26 against the magnetic head 41. While in the present embodiment, no tape pad is associated with the erase head 42, it will be understood that the pressure engagement of the magnetic tape against the erase head is also improved since the tape pad 43 urges the magnetic tape against the record head 41 which is in the retracted position as mentioned previously to cause the tape to follow the retracted path, thus contributing to its bearing engagement against the erase head also.

Figure 5:
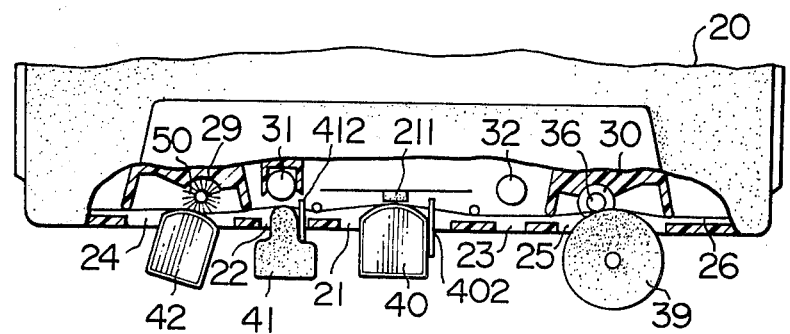
FIG. 5 is a plan view of another embodiment of the cassette tape recorder according to the invention with a tape cassette mounted therein, the cassette being partly shown in section.

FIG. 5 shows a modified embodiment illustrating another mounting position of the tape pad. In this instance, a tape pad 50 is adapted to be inserted into the other capstan hole 29 in the cassette 20 for urging the tape 26 against the erase head 42. At this end, the tape pad 50 may be mounted at a location on the top panel 331 which is remote from the capstan shaft 36 with respect to the position control members 37, 38, or more specifically, at such position on the top panel 331 which is aligned with the capstan hole 29 in the cassette 20 which is not engaged by the capstan shaft 36 of the recorder 33 when the cassette 20 shown in FIG. 1 is mounted in the tape recorder 33 shown in FIG. 2. In a conventional tape recorder, there is nothing at this location which can be utilized to provide the tape pad 50, but an apertured member similar to position control member 37 or 38 as mentioned above may be secured to the cassette at this location. Alternatively, the tape pad 50 may be directly attached to the top panel 331. Where a fixture for the tape pad 50 is attached to the cassette, it is desirable that the fixture prevents the pad from being easily withdrawn even though the pad may be rotatably supported. In this instance, the magnetic tape 26 which bears against the head 42 is not subjected to a sharp curvature as in the embodiment shown in FIG. 3, so that the mounting position of the head 42 need not be retracted. As a consequence, in its operational position, the tip of the head 42 will be well within the capstan hole 29. For this reason, the tape pad 50 which is inserted into the capstan hole 29 may have a diameter which is equal to or slightly less than the diameter of the capstan hole 29 without accompanying a corresponding reduction in the degree of pressure engagement between the tape 26 and the head 42. In this embodiment, no tape pad is associated with the record head 41, but because the magnetic tape is engaged between the erase head 42 and the tape pad 50, sufficient tension is maintained in the portion of the magnetic tape extending between the tape pads 211 and 50 to assure a satisfactory pressure engagement of the magnetic tape 26 against the record head 41.

Figure 6:
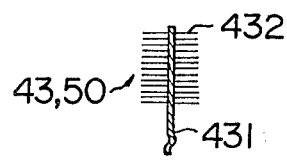
FIG. 6 is a cross section of the tape pad shown in FIG. 2.
Figure 7:
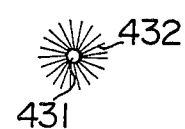
FIG. 7 is a plan view of the tape pad shown in FIG. 6.

FIGS. 6 and 7 show one example of the tape pad which is used in the cassette tape recorder according to the invention. The shank 431 of the tape pad 43 or 50 is formed of a resilient steel material such as piano wire, and is applied with an adhesive such as epoxy resin over a length which exceeds the width of a magnetic tape, for subsequently electrostatically planting short fibres such as polyester or nylon fibres thereon by the use of an electrostatic planting machine. In this manner, there is formed a brush. Where it is desirable to avoid the adverse influence of the magnetic properties of the shank used for the tape pad, the shank may comprise a non-magnetic metallic material such as brass, phosphor bronze or a synthetic resin material such as polypropylene.

Figure 8:
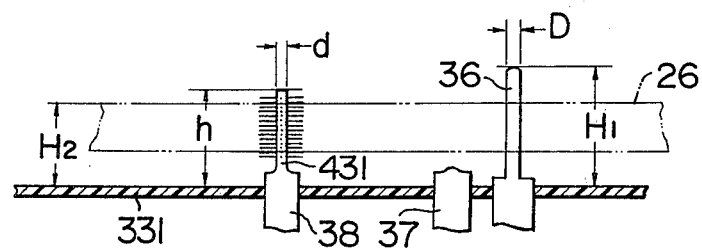
FIG. 8 is a schematic view illustrating the relationship between the tape pad and the capstan shaft in the cassette tape recorder according to the invention.

FIG. 8 shows the dimentional relationship between the capstan shaft 36 and the tape pads 43, 50. Representing the length of the capstan shaft 36 above the panel 311 by $H_1$, its diameter by $D$, the length of the shank 431 of the tape pad above the panel 311 by $h$, its diameter by $d$, and the height of the magnetic tape 26 above the panel 311 by $H_2$, a preferred choice is $H_2 < h < H_1, d \leq D$. With this arrangement, when the tape cassette 20 is mounted in the cassette tape recorder 33, the capstan shaft 36 is initially inserted into the capstan hole 30 in the cassette to serve as a guide for correctly positioning it, thus facilitating subsequent insertion of the tape pad 43, 50. This is also effective to prevent a damage to a tape pad having a relatively thin shank 431.

Figure 9:
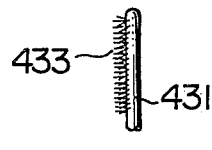
FIGS. 9 to 11 are perspective views of other examples of tape pads which are slightly different from the one shown in FIG. 6.
Figure 10:
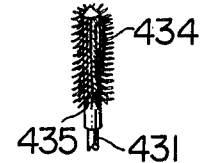
Figure 11:
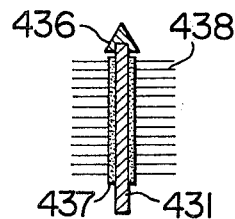
Figure 12:
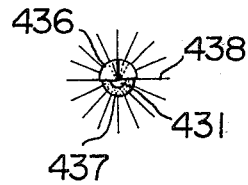
FIG. 12 is a plan view, partly in section, of the tape pad shown in FIG. 11.

FIGS. 9 to 12 show other examples of the tape pad. As shown, the tape pad may be provided with a brush portion 433 only along that portion of its circumference which faces the magnetic tape (FIG. 9). FIG. 10 shows that the tape pad may comprise a plurality of yarns 434 of material such as nylon or polyester which are in the form of loops or needles coupled with a textile tissue 435 which is in turn adhesively secured to the shank 431. In FIG. 11, the shank 431 is covered with a resilient sleeve 437 which is formed of a material such as rubber and on which is planted short fibres 438 to form a brush. The forward end of the shank is provided with a cap 436 to prevent a direct abutment of the resilient sleeve with the tape cassette when the tape pad is inserted thereinto. This arrangement permits a reduction in the thickness of the shank 431 and also protects the root of the brush.

While in the above description, the tape pad 43, 50 has been described as being associated with either a record heat 41 or an erase head 42, it will be readily appreciated that two of such pads may be concurrently associated with the both heads. Also, the above description deals with only one of the smaller windows 22, but it will be understood that a magnetic head may be disposed for insertion into the other window 23 for cooperation with a similar tape pad. Additionally, while the above description deals with a recorder having three magnetic heads, it should be understood that the invention is equally applicable to a recorder having a combined record/playback head which is adapted to be inserted into a central window in the cassette as well as an erase head which is disposed for insertion into a window located on the opposite side of the central window from that in which the pinch roller is inserted. In this instance, the tape pad according to the invention may be provided in opposing relationship with the erase head for assuring a satisfactory erasing operation.

Having described the invention, what is claimed is:

1. A cassette tape recorder for use with a tape cassette for containing a magnetic tape, the cassette being formed in its front end face with a central window in which an internal tape pad is provided and with a pair of smaller windows and a pair of larger windows which are disposed symmetrically with respect to the central window, the respective windows exposing a portion of the magnetic tape, the cassette further including an upper and a lower wall in which are formed a pair of position control apertures corresponding to the smaller windows, a pair of capstan holes corresponding to the larger windows and a pair of reel openings in which spools for taking up the magnetic tape are disposed therein; the recorder comprising a capstan shaft adapted to be inserted into at least one of the capstan holes in the cassette during use of the cassette, a pinch roller adapted to be inserted into one of the larger windows which corresponds to the capstan hole in which the capstan shaft is inserted, for cooperating with the capstan shaft to cause the magnetic tape to run, a first magnetic head adapted to be inserted into the central window in the cassette for contact with the magnetic tape, at least second magnetic head adapted to be inserted into one of the remaining windows in the cassette, and a tape pad means mounted in the recorder for insertion into the aperture or hole which corresponds to the window other than the central window into which said second magnetic head is inserted for urging the magnetic tape against the second magnetic head.

2. A cassette tape recorder for use with a tape cassette for containing a magnetic tape, the cassette being formed in its front end face with a central window in which an internal tap pad is disposed and with a pair of relatively smaller windows and a pair of relatively larger windows which are disposed symmetrically with respect to the central window the windows exposing a portion of the magnetic tape therethrough, the cassette further including an upper and a lower wall in which are formed a pair of position control apertures corresponding to the smaller windows and a pair of capstan holes corresponding to the larger windows as well as a pair of reel openings in which spools for taking up the magnetic tape are disposed; the recorder comprising a capstan shaft adapted to be inserted into one of the capstan holes during use of the tape cassette, a pinch roller adapted to be inserted into one of the larger holes which corresponds to the capstan hole into which the capstan shaft is inserted, for cooperating with the capstan shaft to cause the magnetic tape to run, a first magnetic head adapted to be inserted into the central window in the cassette, and a second magnetic head adapted to be inserted into one of the smaller windows which is located remote from the capstan shaft, a third magnetic head adapted to be inserted into the remaining larger window, the magnetic heads being adapted to be brought into contact with the magnetic tape, and a tape pad means mounted in the recorder for insertion into the aperture or hole which corresponds to the window into which one of the second or third heads is inserted.

3. A cassette tape recorder according to claim 2 wherein the tape pad means is adapted to be inserted into the aperture or hole which corresponds to one of the smaller windows.

4. A cassette tape recorder according to claim 2 wherein the first magnetic head is a playback head, the second magnetic head is a record head and the third magnetic head is an erase head.

5. A cassette tape recorder according to claim 3, further including a pair of position control means in a substantial alignment with the capstan shaft and adapted to engage the position control apertures in the cassette for determining the height of the front portion of the cassette, the tape pad means being mounted on one of the position control means.

6. A cassette tape recorder according to claim 1 wherein the tape pad means is in the form of a brush.

7. A cassette tape recorder according to claim 6 wherein the tape pad means comprises a shank of a resilient material, and short fibres of a material such as nylon or polyester which are bonded with the shank.

8. A cassette tape recorder according to claim 7 wherein the shank is applied with an adhesive for electrostatically planting short fibres thereon.

9. A cassette tape recorder according to claim 5 wherein the position control means is formed with an opening in its top which receives the shank of the tape pad means for securing it therein.

10. A cassette tape recorder according to claim 6 wherein the tape pad means comprises a plurality of needle-like yarns of a synthetic fibre material such as nylon or polyester which are bonded with a textile tissue adhesively secured to the shank.

11. A cassette tape recorder according to claim 6 wherein the tape pad means comprises a plurality of short fibres planted on a resilient sleeve which is fitted on the shank.

12. A cassette tape recorder according to claim 11 wherein the resilient sleeve is formed of rubber.

13. A cassette tape recorder according to claim 6 wherein the brush of the tape pad means has a diameter which is greater than that of the aperture hole in the cassette through which it is inserted.

14. A cassette tape recorder according to claim 1 wherein the tape pad means has a length less than that of the capstan shaft.

15. A cassette tape recorder according to claim 2 wherein the inner end of the first magnetic head extends a greater distance into the cassette than the inner end of the second magnetic head and the tape pad means urges the magnetic tape against the second magnetic head in its operational position.

* * * * *